May 12, 1964  NOBUO MORISAWA  3,132,602
PHOTOGRAPHIC COMPOSING MACHINES
Filed Dec. 22, 1959  4 Sheets-Sheet 1

INVENTOR.
Nobuo Morisawa,
BY
Attorney.

May 12, 1964  NOBUO MORISAWA  3,132,602
PHOTOGRAPHIC COMPOSING MACHINES
Filed Dec. 22, 1959  4 Sheets-Sheet 2
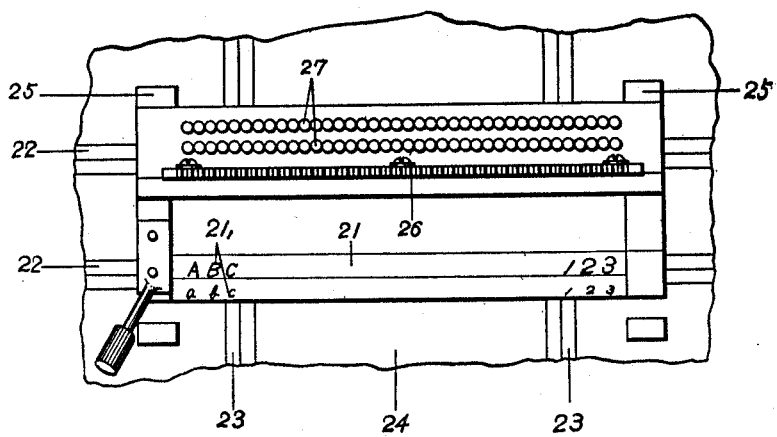
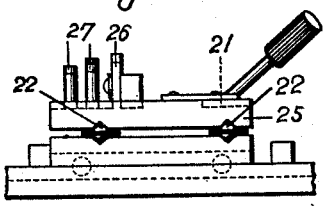
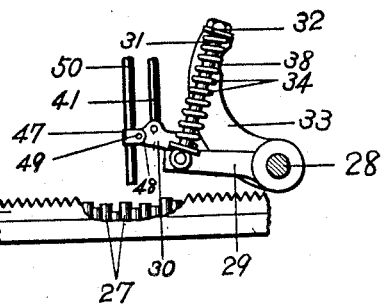
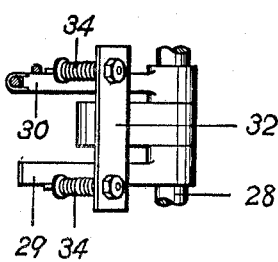
INVENTOR.
NOBUO MORISAWA,
BY INVENTOR.
NOBUO MORISAWA,
BY
Attorney United States Patent Office 3,132,602
Patented May 12, 1964

3,132,602
PHOTOGRAPHIC COMPOSING MACHINES
Nobuo Morisawa, 351 Hitomaru-cho, Akashi, Japan
Filed Dec. 22, 1959, Ser. No. 861,270
1 Claim. (Cl. 95—4.5)

This invention relates to photographic composing machines, in which a lamp is placed under a glass letter plate having a number of white letters arranged on a black ground, a photographic tube having a lens and a mouth permitting light only for one of the letters to be photographed is installed above the plate opposite to the lamp, and above the photographic tube is set a shutter, and a magazine having a sensitive film on which to photograph the letters of the letter plate to get a negative print. New alphabets are so various in width that the intervals between letters photographed by a photographic composing machine of a known type are not uniform, presenting an unshapely print.

The object of the present invention is to provide means for photographing letters of various widths at certain regular intervals to get a shapely print.

The present invention provides a photographic composing machine comprising a letter plate, a controller on a movable frame, variable in height according to the widths of the corresponding letters on the letter plate, means adapted to move a stopper on a ratchet wheel according to the heights of the controller, and a speed change device driven by the ratchet wheel for feeding lengthwise a film magazine to photograph letters at regular intervals.

Other and the further objects of the present invention will become apparent from the following specification and claim taken together with the accompanying drawings in which is shown the preferred embodiment of the photographic composing machine according to the present invention.

FIG. 2 is a plan view showing relative positions of a letter plate, a rack and a controller.

FIG. 3 is a side view of FIG. 2.

FIG. 4 is a side view of a vertically movable rod.

FIG. 5 is a plan view of FIG. 4.

Figure 1:
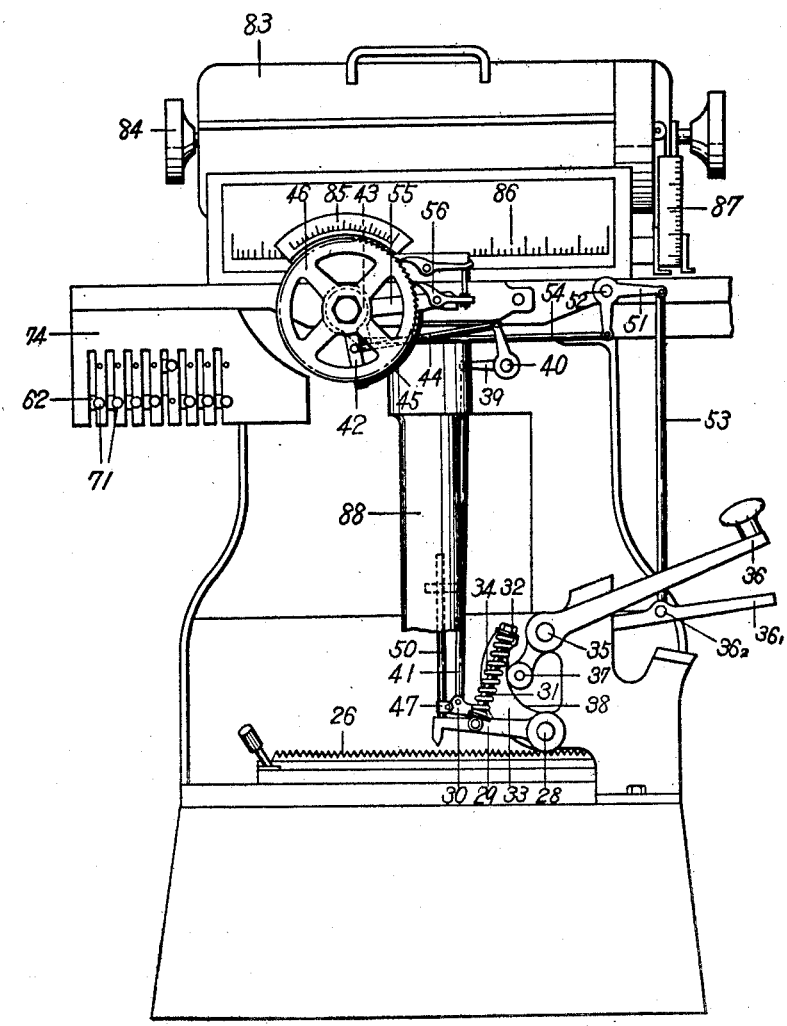
FIG. 1 is an elevation view of a photographic composing machine with parts removed and illustrating a variable letter spacer according to the present invention.

In these drawings reference numeral 21 (FIG. 2) indicates a letter plate made of a sheet of transparent film having white letters $21_1$ arranged on a black ground, inserted between a pair of transparent glass plates. Upon transverse rails 22 and longitudinal rails 23 fixed on a table 24 is mounted a slidable frame 25 so as to be moved lengthwise or crosswise at will. Upon the slidable frame 25 are fixed the letter plate 21, a rack 26 having wedge-shaped teeth and a controller 27 consisting of a number of rods arranged in the same order as the letters $21_1$ on the plate 21 and of various heights according to the widths of the corresponding letters $21_1$. On a rod 28 (FIGS. 4 and 5) are supported levers 29 and 30, each of which is connected by a rod 31 with an arm 32 of a lever 33 mounted on the rod 28. The rod 31 is provided with a spring 34. On a rod 35 is mounted a handle 36 which has a roller 37 for operating a cam surface 38 formed on the lever 33.

The lever 30 is connected with an arm of a bell-crank 39 (FIG. 1) mounted on a pin 40 by a connecting rod 41, and the other arm of the bell-crank 39 is connected with a lever 42 mounted on a shaft 43 by a connecting rod 44. The end of the lever 42 is fixed to a stopper 45 on a ratchet wheel 46. A supporter 47 (FIG. 4) jointed to a projection 48 of the lever 30 by a pin 49 supports a vertically movable rod 50.

An operating lever $36_1$ mounted on the rod 35 (FIG. 1) and having a pin $36_2$ is connected with an arm of a bell-crank 51 mounted on a pin 52 by a connecting rod 53, and the other arm of the bell-crank 51 is connected by a connecting rod 54 with an arm of a bell-crank 55 mounted on the shaft 43, and the other arm of the bell-crank 55 is provided with a pawl 56.

Figure 8:
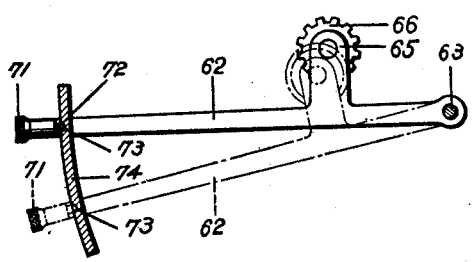
FIG. 8 is a side view of a part of a device for operating an intermediate gear in the speed change gearing.
Figure 9:
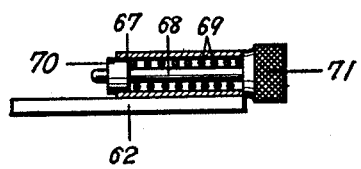
FIG. 9 is an enlarged plan view of a part of a lever for intermediate gear.

A bevel gear 57 (FIG. 6) mounted on the shaft 58 of the ratchet wheel 46 is meshed with a bevel gear 59 mounted on a shaft 60. On the shaft 60 are mounted stepped gears 61, and levers 62 are mounted on rod 63 (FIG. 7), supported by a spring 64. On a carrier 65 formed on each lever 62 is mounted an intermediate gear 66, the free end of each lever 62 is provided with a casing 67 (FIG. 9), in which is installed a rod 68 having a spring 69 supported by a supporter 70, and a knob 71 is fixed to the other end of the rod 68 outside the casing 67. The supporter 70 is provided with a pin 72 (FIG. 8) adapted to fit in an upper or a lower hole 73 formed in a supporting plate 74 fixed to a frame 75.

Stepped gears 76 (FIG. 6) are mounted on a shaft 77, smaller ones placed opposite to greater ones of the stepped gears 61. A bevel gear 78 mounted on the shaft 77 is meshed with a bevel gear 79 mounted on a shaft 80, on which a pinion 81 is mounted to mesh with a rack 82 (FIG. 7) fixed to the under surface of a film magazine 83. 84, 85, 86 and 87 (FIG. 1) indicate a knob of a scroll for the sensitive film, scales for the feed of the ratchet wheel 46, the longitudinal feed for the film magazine 83, and the circumferential feed for the same, respectively.

Figure 7:
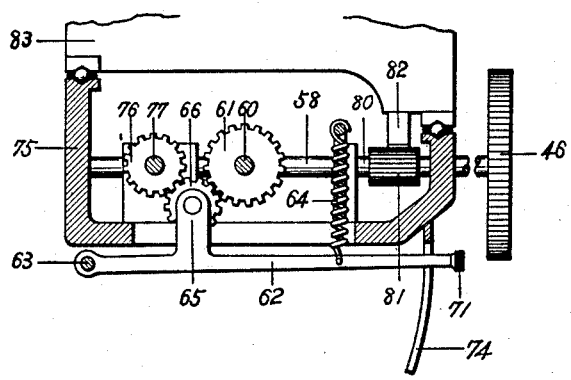
FIG. 7 is a side view of FIG. 6.

Before the operation, one of the pins 72 is got out of the lower hole 73 (FIG. 8) by pulling the knob 71, the lever 62 is drawn up by the spring 64 and the pin 72 fits in the upper hole 73, the intermediate gear 66 meshing with the stepped gears 61 and 76 (FIG. 7). Then a letter $21_1$ (FIG. 2) is placed under the lens in a photographic tube 88, (FIG. 1), and the handle 36 is pushed down. In this operation a shutter (not shown) is opened, and the picked letter $21_1$ is photographed on the sensitive film in the magazine 83. At the same time, the cam 38 (FIG. 1), moved by the roller 37, turns the rod 28, with the arm 32 pulled down pressing the spring 34, and the detent shown at the end of the lever 29, when lowered, meshes with the rack 26, holding the letter plate 21 immovable. And the lever 30 turning downward, the vertically movable rod 50 comes in contact with the controller 27 (FIGS. 2–4) corresponding to the picked letter $21_1$, and the downward motion of the lever 39, transmitted by the connecting rod 41, the bell-crank 39 and the connecting rod 44, turns the lever 42, turning the stopper 45 for the peripheral length corresponding to the height of the round rod 27 to control the movement of the pawl 56. When the handle 36 is pushed further down pushing the pin $36_2$, the operating lever $36_1$ is turned downwardly and the movement, transmitted by the connecting rod 53, the bell-crank 51 and the connecting rod 54, turns the bell-crank 55 turning the pawl 56 to touch with the stopper 45.

When the pushing force is removed from the handle 36, the handle and the operating lever $36_1$ are turned back upwardly, and then the stopper 45 is turned back, and the ratchet wheel 46, turned by the pawl 56, drives the stepped gear 61 by means of the bevel gears 57 and 59, moves the rack 82 through the cooperation of the intermediate gear 66, the stepped gear 76, the bevel gears 78 and 79, and the pinion 81. Thus the magazine 83 is fed the length according to the width of the picked letter $21_1$. In this, by choosing some proper lever 62, pulling its knob 71 and fitting the pin 72 in the upper hole 73, according to the size of the letters $21_1$, they are photographed at the other regular intervals.

Figure 6:
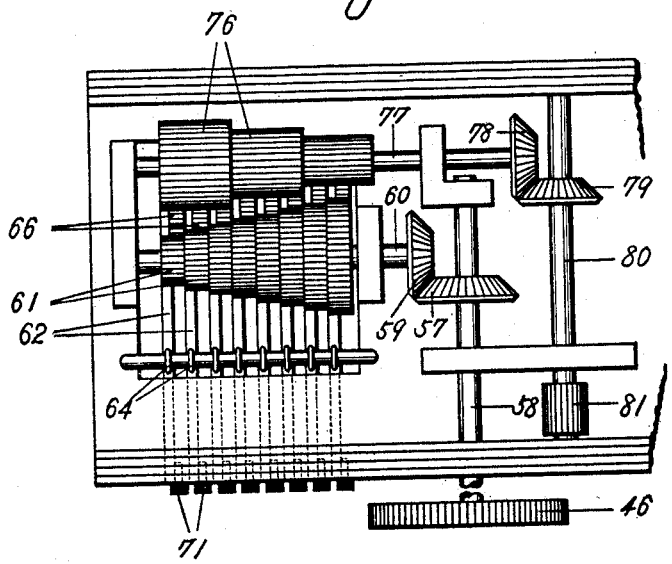
FIG. 6 is a plan view of a spaced change device for a magazine.

In the arrangement shown, the letter space proportioning mechanism of FIG. 4 as shown in FIG. 1, by way of rod 41, bell-crank 39—40, rod 44 and arm 42, positions the shield or stopper 45 to expose to the drive pawl 56 a portion of the circumference of ratchet wheel 46 proportional to the width W of the selected letter. The further operation of handle 36 against pin $36_2$, by way of rod 53, bell-crank 51, rod 54 and bell-crank 55 sets the pawl 56 on top of the shield or stopper 45 ready to advance the ratchet wheel in accordance with the setting of the stopper 45 as the handle 36 is again raised. The advance of the ratchet wheel 46 as shown in FIGS. 6 and 7, operates through change gears 61, 66, 76 to rotate the pinion 81 and advance the rack 52 and film magazine 83.

This arrangement affords three factors applicable to determine the center-to-center spacing of the letters for open or close letter spacing, viz: the motion of the ratchet wheel 46 is determined by (1) the height of the pin 27, FIG. 4, which is proportional to letter width W (2) the adjustment of rod 50 relative to rod 41, which adds a selected fixed amount of movement S to ratchet wheel 46, this added amount S determining the minimum spacing between letters, which is obtained when the smallest gear 61 drives to the largest gear 76

(3) selection of a larger gear ratio R of the change gears 61, 66, 76 to change the center-to-center spacing of the letters in proportion to the sum of $W+S$.

Thus by virtue of this triple control, when more open letter spacing is desired, the same alteration of the setting of change gears 61, 66, 76 widens the space allotted to each letter, not by merely some fixed amount, but by an amount proportionate to the width of the letter and the initially set minimum letter spacing. In other words, the speed control or change speed gears multiply the spacing $W+S$ by the selected factor R for more open spacing which is determined by $W+S \times R$, and does not merely substitute for one fixed value of S another fixed value of S, as has been previously known. As a result with the new arrangement, a selected proportion of letter widths to letter spacing widths may be preserved throughout close or open order reproduction.

Figure 10:
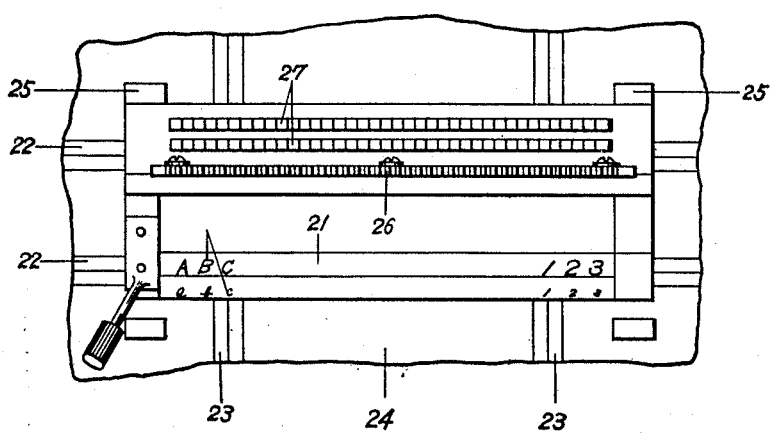
FIG. 10 is a plan view showing relative positions of a letter plate, a rack and a controller of a modified photographic composing machine according to the present invention.
Figure 11:
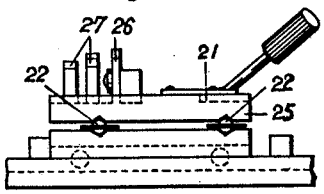
FIG. 11 is a side view of FIG. 10.

As shown in FIGS. 10 and 11, the controller 27 may be made by means provided with various height portions according to the width of the corresponding letters $21_1$ and the controller 27 may have either a round, square, or other general and convenient cross-section.

It is thought that the invention and its advantages will be understood from the foregoing description and it is apparent that various changes may be made in the form, constructions and arrangement of the parts without departing from the spirit and scope of the invention or sacrificing its material advantages, the form hereinbefore described and illustrated in the drawings merely a preferred embodiment thereof.

Having thus described my invention, what I claim and desire to secure by Letters Patent of the United States is:

A photographic composing machine comprising a lens tube, a letter plate exhibiting letters to be photographed through said lens tube and movable transversely relative to said lens tube, a film magazine movable transversely relative to said lens tube, and letter spacing means comprising a spacing controller associated with each letter of said letter plate and of a height corresponding to the width of the associated letter, feeding means comprising a pawl and ratchet mechanism for moving said film magazine relative to said lens tube for spacing the images of letters photographed thereon, said pawl and ratchet mechanism comprising a stopper variably positioned to control said spacing, and means controlled by said spacing controllers, respectively, for varying the position of said stopper, said feeding means further comprising a speed change gearing connected in the drive between said ratchet mechanism and said film magazine for multiplying by a selected gear ratio of said speed change gearing the letter spacing effected by said feeding means under control of said controllers.

References Cited in the file of this patent
UNITED STATES PATENTS

| | | |
|---|---|---|
| 1,283,394 | Bawtree | Oct. 29, 1918 |
| 2,207,265 | Ogden | July 9, 1940 |